United States Patent
Boyce et al.

(10) Patent No.: US 6,934,838 B1
(45) Date of Patent: Aug. 23, 2005

(54) METHOD AND APPARATUS FOR A SERVICE PROVIDER TO PROVIDE SECURE SERVICES TO A USER

(75) Inventors: Kevin G. Boyce, Ottawa (CA); Ron A. McEwen, Hamilton (CA)

(73) Assignee: Entrust Technologies Ltd., Ottawa (CA)

( * ) Notice: Subject to any disclaimer, the term of this patent is extended or adjusted under 35 U.S.C. 154(b) by 0 days.

(21) Appl. No.: 09/088,228

(22) Filed: Jun. 1, 1998

(51) Int. Cl.[7] ............................................. H04L 9/00
(52) U.S. Cl. ..................... 713/156; 713/168; 713/182
(58) Field of Search ................................. 713/155–156, 713/161–162, 175–176, 150, 158, 166–170, 173, 200–202, 182; 705/74–76, 64, 67

(56) References Cited

U.S. PATENT DOCUMENTS

| | | | | |
|---|---|---|---|---|
| 5,475,758 A | * | 12/1995 | Kikuchi | 713/156 |
| 5,604,803 A | * | 2/1997 | Aziz | 713/155 |
| 5,982,898 A | * | 11/1999 | Hsu et al. | 713/156 |
| 6,005,939 A | * | 12/1999 | Fortenberry et al. | 705/76 |
| 6,026,166 A | * | 2/2000 | LeBourgeois | 713/156 |
| 6,154,841 A | * | 11/2000 | Oishi | 713/180 |
| 6,202,157 B1 | * | 3/2001 | Brownlie et al. | 713/201 |
| 6,327,656 B2 | * | 12/2001 | Zabetian | 713/176 |

* cited by examiner

*Primary Examiner*—Hosuk Song
(74) *Attorney, Agent, or Firm*—Vedder, Price, Kaufman & Kammholz, P.C.

(57) ABSTRACT

A method and apparatus for establishing security credentials for a user to access and subsequently use in secure on-line transactions begins when a service provider generates a registration secret for a user in response to a registration request. The registration request identifies user information of a particular user. Before a registration request can be provided to the service provider, the user must establish a relationship with the service provider. Having generated the registration secret, the service provider stores a user identifying secret, which includes the initialization data, the user information, the registration secret, and/or a security name in a mapping repository. The service provider provides the registration secret to the user in a trustworthy manner. Sometime thereafter, the user provides an on-line initialization request for the initialization data, where the initialization request is encoded based on at least a part of the user identifying secret. Upon receiving the request, the service provider decodes the request and subsequently provides the initialization data to the user. The user then utilizes the initialization data to obtain security credentials. Once the user has obtained the security credentials, it utilizes them for on-line transactions with the service provider.

47 Claims, 5 Drawing Sheets

METHOD AND APPARATUS FOR A SERVICE PROVIDER TO PROVIDE SECURE SERVICES TO A USER

TECHNICAL FIELD OF THE INVENTION

The present invention relates generally to distributed communications and more particularly to secure services being provided over distributed communication channels.

BACKGROUND OF THE INVENTION

With the advent of the Internet, computer users have access to unparalleled amounts of data. For example, computer users can access web pages of companies to obtain company information, access on-line magazines, articles and a plethora of other information. In addition, web page owners obtain marketing information (e.g., number of total hits, number of hits for a particular product, demographic information of the hits, etc.), broader distribution channels, broader advertising base, and many other benefits.

The Internet also offers computer users the ability to conduct transactions with on-line businesses. For example, computer users may purchase products on-line. To do this, the user accesses the web page of the company selling the product, identifies the product and provides payment information (e.g., credit card number). The computer user may also perform on-line banking, on-line brokering, on-line grocery shopping, with new services being developed continually.

While each of these on-line services offer computer users greater convenience, there is a risk that the user information (e.g., credit card number, account number, social security number, other personal data) may be compromised. Once compromised, other parties in possession of this information may perform these on-line services for themselves at the real user's expense. To minimize the possibility of user information being misappropriated, many on-line services, such as on-line banking, offer a security mechanism to protect on-line transactions.

Current on-line banking security techniques use secure sockets layers ("SSL") U.S. Pat. No. 5,657,390. SSL is a session style protocol providing authentication and protection based on a 40-bit or 128 bit encryption key that the web server of the bank accesses to use as a session key for a transaction with an on-line customer. Utilizing the SSL information and end-user information (e.g., account number, social security number, credit card number, etc.), the bank can reasonably be assured that the transaction will be done in a secure manner, but cannot verify that the person initiating the on-line banking transaction is the person with whom the bank established the account. Thus, a level of uncertainty still exists in on-line secured banking transactions. Further, SSL is browser driven, which under the control of the browser supplier.

Therefore, a need exists for a method and apparatus that enhances secured on-line transactions by allowing the service provider to verify the user it is conducting a transaction with and further enhances security of on-line transactions, by making secured on-line transactions independent of the browser suppliers and certification authorities.

DETAILED DESCRIPTION OF A PREFERRED EMBODIMENT

Figure 1:
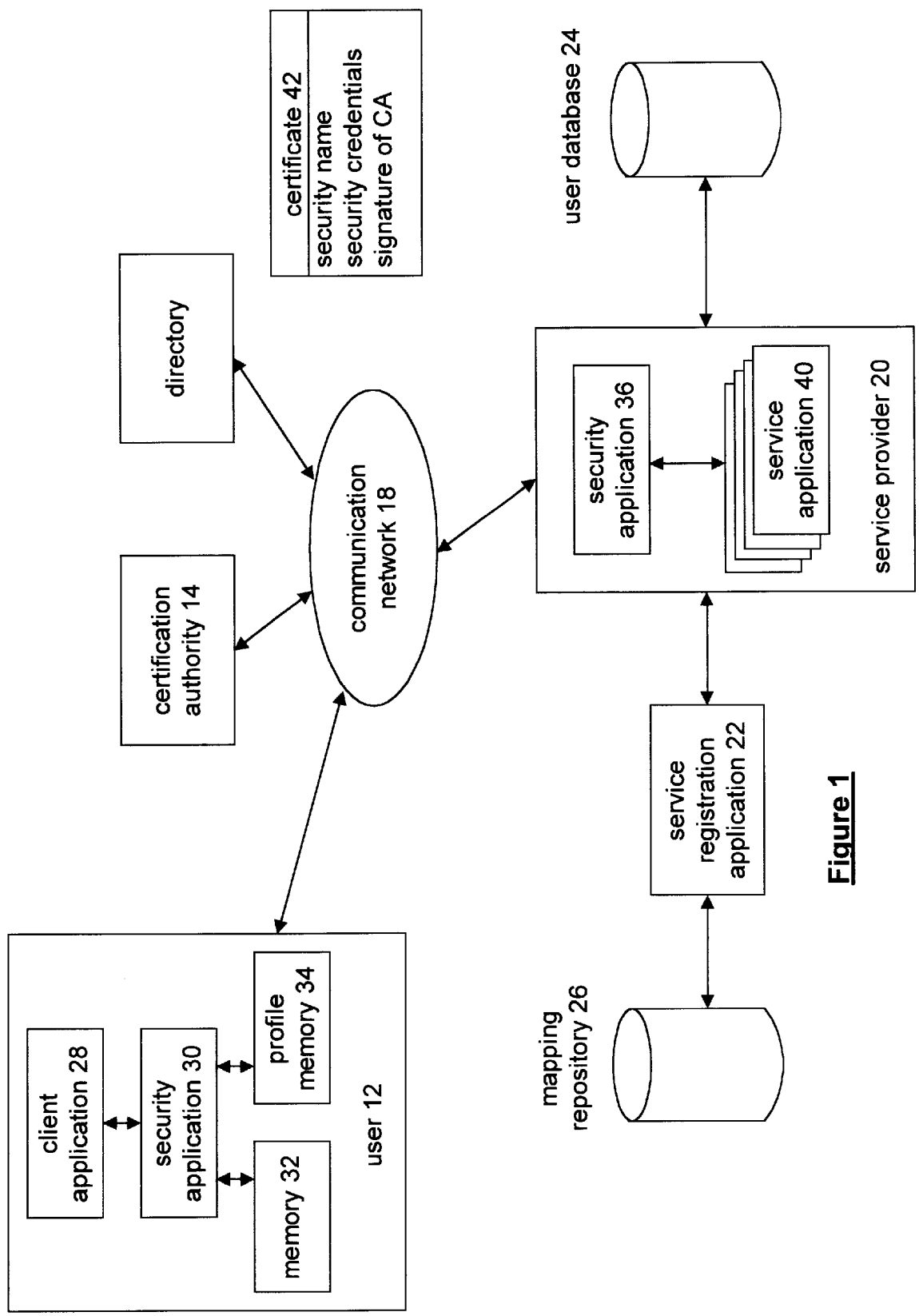
FIG. 1 illustrates a schematic block diagram of an on-line communication environment in accordance with the present invention.

Generally, the present invention provides a method and apparatus for establishing security credentials for an end user (e.g., a person or entity/machine or organizational role) to access and subsequently use in secure on-line transactions. This begins when a service provider (e.g., a telecommunications company, a bank, a corporation, corporate departments, etc.) generates a registration secret for the user in response to a registration request. Alternately the secret may be pre-shared (e.g., previous billing records, family history) so that the registration request is not required. The registration request identifies user indexing information which will uniquely identifying the user to particular service applications (e.g., phone number/gas meter account, bank information.). Before a registration request can be provided to the service provider, the user must establish a relationship with the service provider. For example, if the service provider is a bank, the user must have established a bank account, or some other account, with the bank.

Having generated the registration secret, if one is needed, the service provider then assigns initialization data and stores this with the user indexing information, the registration secret, and a security name (which may be an arbitrary name assigned by the service provider that has no direct relation to the user, a descriptive name of the user, or may be identical to the user indexing information) in a mapping repository. The initialization data contains confidential information which will be used subsequently to obtain security certificates which are certified by the service provider's Certificate Authority [CA]. For example, in one CA, the initialization data may be a reference number and authorization code. These certificates are established by the service provider using a manager/bulk load process. The service provider may optionally configure additional "alternate user indexing information" associated with a security name to identify the user to disparate service applications.

Having mapped the data, the service provider provides the registration secret to the user in a trustworthy manner (optional in the pre-shared case). Sometime thereafter, the user interacts with a client application (e.g., a browser, a mail system or collaborating group of applications) and provides an on-line initialization request for the initialization data. The initialization request contains proof of knowledge of the user identifying secret which includes at least the registration secret and optionally the user indexing information. Upon receiving the request, the service provider processes the request and subsequently provides the initialization data to the user in a secure manner. The user then utilizes the initialization data to obtain profile information, which includes security credentials (e.g., signature and/or encryption public key certificate) and related information (e.g., private signing and/or encryption keys). Once the user has obtained the profile information, it utilizes it for on-line transactions with the service provider. The client security application, which is an intermediate application or may be integrated into the client application, obtains the server security application security credentials from a directory such that the service provider can authenticate the user and conduct on-line transactions with a more secure process. With such a method and apparatus secure on-line transactions are enhanced. Such enhancement results because the security credentials are assigned to a particular end-user. Thus, the service provider may authenticate the user, based on the security credentials, before providing the requested on-line services. Once authenticated, the on-line transaction is initiated using a more secure encryption process than in prior implementations.

The present invention can be more fully described with reference to FIGS. 1 through 5. FIG. 1 illustrates a schematic block diagram of a communication environment 10 that includes a plurality of users 12, a certification authority 14, a directory 16, a communication network 18, a service provider 20, a service registration application 22, a user database 24, and a mapping repository 26. The certification authority 14 is a computing device, such as a personal computer, workstation, etc., which assigns security credentials to users affiliated therewith. For example the certification authority 14 may be coupled to a plurality of users 12 directly or indirectly through the communication network 18. In addition, the certification authority 14 may also include security management software such that the certification authority acts as the manager for the secure communication environment 10. To function as a manager, the computing device would include secure management software such as Entrust/Manager, which is produced and manufactured by Entrust Technologies, Ltd.

The directory 16 is coupled to the certification authority, the plurality of users, and the server/manager directly or via the communication network 18, which may be the Internet, Local Area Network, Wide Area Network, and/or any digital coupling network. The directory 16 functions as a repository for security credentials 42 that any member may access. Thus, the security credentials 42 stored in the directory 16 are publicly available to users affiliated with the system 10. As shown, the security credentials 42 include a security name of a user (which may be an arbitrary or descriptive name of the user), and authenticating information (which for a public key encryption system include an encryption public key or a signature verification public key signed by the certification authority.) Users that obtain security credentials may verify that they are certified by the CA (e.g., in the public key scheme by using a public key signature verification algorithm such as RSA). The profile information enables the holder to prove ownership of the security credentials, e.g., in the public key scheme, the profile information holds the corresponding private key.

The plurality of users 12 (one shown) includes a client application 28, a security application 30, memory 32 and security credentials memory 34. The client application 28, which may be Navigator™ by Netscape™, a mail handler, browser application, other server application, or group of collaborating server applications, allows a computer user to access service applications (which may include web server based apps or other) of service providers 20 via the communication network 18. The security application 30 secures transmission to and from the client application 28 based on the particular content of the data and/or the targeted communication party. The security application may be integrated into the client application or it may be a distinct intermediating application. As such, the security application 30 would secure any transmissions to and decrypt/verify any transmissions from the service provider 20.

Memory 32 is a random access memory, floppy disk memory, hard disk memory, magnetic tape memory, DVD ROM memory, CD ROM memory, and/or any means for storing digital information. The user 12 utilizes the memory to temporarily store information received from the service provider to facilitate the secure communications. This will be discussed in greater detail below. The profile memory 34 that is included within memory 32 or is a separate memory device. The profile memory 34 stores profile information such as, for example, an encryption public key algorithm (e.g., RSA) an encryption public key pair, and a signature verification public key pair and corresponding private keys. The utilization and acquisition of the profile information will be discussed subsequently.

The service provider 20 includes a security application 36, and a plurality of service applications 40. The security application 36 enables the service provider to communicate, in a secure manner, with the plurality of users 12. The service applications 40 may be integrated with a web server and include on-line banking, on-line brokering, on-line shopping, and/or any other user/service provider transactions or information access, e.g., sales information, documents, statistics, payroll information, pension plan information, medical information, employee performance information, etc. Note that the security application 36 can be programmed to not process unsecured requests from users 12. As such, if an unsecured request is received, the security application 36 would return an error message to the user 12 indicating that authentication is required and providing it's security name. The user's security application 30 would use the server security name to obtain and verify the server's security credentials and begin authenticating and protecting the session.

To establish a secure transaction between the user 12 and the service provider 20, a relationship between the two entities must exist. For example, if the user 12 desires on-line banking services, the user must first established a banking account (e.g., checking, savings, credit card, certified deposit (CD), etc.) with the banking service provider, where the account is identified by an account number (i.e., user information). Once the account is established, the user may request secured on-line banking services, where the request is provided to the service provider in a trustworthy manner. For example, the on-line banking request may telephoned in to the bank, where the user identifies his or her account by its account number, and possibly some other identifying information (e.g., mother's maiden name, home address, social security number, etc.). Alternatively, the request may be done in person. As a still further alternative, the request may be transmitted to the bank via an ATM (automatic teller machine). Regardless of how the registration request is communicated to the service provider, the service provider verifies the request (e.g., valid account number, correct user, etc.) and generates a registration secret. The registration secret, the user information, and security name are mapped into the mapping repository 26 via the service registration application. Note that the registration secret may have a validity period of N days, such that if the user does not initiate a request using the registration secret, the registration secret will be invalid. Further note that the service registration application 22 may be incorporated into the service provider 20, or it may be incorporated into a stand-alone computing device. For the balance of this discussion, the service registration application 22 will be treated as if it were incorporated in the service provider 20. But, as one skilled in the art will readily appreciate, the functionality of the service registration application 22 is essentially the same whether it is incorporated into a stand-alone device or is incorporated into the service provider 20.

The mapping repository 26 of FIG. 1 stores security names and corresponding mapping information. For example, in an on-line banking application, the mapping information would include user information (e.g., account 1, account 2, etc.), the registration secret, and the initialization information (e.g., a reference number and an authorization code). The mapped table may be generated on a per request basis such that when a user requests a secured service, the certification authority 14 issues the security name and the initialization information. As such, the certification authority 14 would, at the request of the service provider, establish a security name for the user and generate the initialization data. Alternatively, the mapping repository 26 may be bulk-loaded with a plurality of security names and corresponding initialization data. With the bulk loading, when a registration request is received from a user, the service provider allocates one of the security names to the requesting user. Note that the security name may be an anonymous name such as a sequence of numbers (i.e., have an arbitrary relationship to the user) or it may be a descriptive name of the user. Further note when anonymous names are used for the security names, the certificates stored in the directory 16 are anonymous, thereby providing a level of anonymity to the system. As such, possession of anonymous certificates provides no directly identifying information of the user and his or her user information. Thus, even though the certificates are stored in a publicly accessible directory, they are only useful in this application, which substantially limits the service provider's liability.

After mapping the information into the mapping repository 26, the service provider 20 informs the user of the registration secret. If the registration request were made via human contact, the registration secret could be provided via the same mechanism or mail. If the registration request were made via an electronic medium, the registration secret could be provided through the same medium. Once the user has obtained the registration secret in the trustworthy manner, it is temporarily stored in memory 32.

Alternatively the registration secret is pre-shared information such as a previous invoice number etc, employee number etc. In this case the mapping is created in advance via the bulk process described above, on demand, subsequent to a personal or electronic request.

To obtain security credentials to access the desired secured service (e.g., the on-line banking), the user accesses the client application 28 causing it to pull up an initialization requesting form. The form prompts the user to enter its user indexing information (e.g., name, address, account number, credit card number, social security number, etc.), and the registration secret, which may be 8 to 16 digits in length. This information is then passed to the security application 30, which generates an initialization request based on the user identifying secret derived from the user indexing information and registration secret. The initialization request contains proof of knowledge of the user identifying secret, for example, utilizing the user identifying secret as input to a hashing algorithm or in conjunction with a message authentication code algorithm. Alternatively, the user indexing information is passed to the security application 30, which encodes the initialization requests based on the registration secret and the user information. In other words, utilizing an encryption algorithm such as the data encryption standard ("DES"), the registration secret and the user information to encode a symmetric key into a session key, the request is encrypted.

The initialization request is provided, via the communication network 18 to the service provider 20. Note that service applications 40 may intermediate the forwarding of the request to the service registration application 22 or the request may be sent directly to the service registration application (SRA) 22. The service registration application 22 verifies the initialization request utilizing the same algorithm and the stored user identifying secret. If the initialization request was properly verified, the SRA 22 may generate, assign, and retrieve the initialization data from the mapping repository 26 for the requesting user. The initialization data is then encrypted by the SRA 22 using a key derived from the user identifying secret (for example by an algorithm such as MD5) known by the client security application 30. Alternatively, the key may encrypted based on the registration secret and the user information. The encrypted initialization data is then sent to the user via the communication network 18. Upon receiving the encrypted initialization data, the user decrypts it using the appropriate key, e.g., one derived from the user identifying secret in the same way as above. The decrypted initialization data is then stored in memory 32. In this way it is computationally infeasible for any entity without knowledge of the user identifying secret to obtain the initialization information.

Once the user has obtained the initialization data, the user may access the certification authority to obtain profile information, which will include security credentials. Such security credentials may include an encryption certificate and a signature certificate. Once the user has obtained the profile information, it stores them securely in the profile memory 34. Security credentials are stored in the directory under the security name of the user. Note that for public key encryption as produced by Entrust Technologies, the security credentials would include a reference number and an authentication code.

Once the user 12 has obtained its security credentials, it may now access a secured service (e.g., secure on-line banking). To access the on-line secured service, the user, via a browser application, addresses a service application 40 of the service provider 40. The initial request may be done in a non-secure manner wherein the user is identified by its security name. Recall that the security name may be an arbitrary name, which, without the mapping repository, has no connection to the particular user or may be inconvenient for service application indexing purposes. Upon receiving the unsecured access request, the security provider 20 responds with its security name. The client application 28 obtains the service provider's credentials from the directory using this security name. The credentials are then validated and used to establish authenticated secure communications between the client security application 30 and the service provider security application 36. Note that the communications mechanism may be a session protocol where the credentials are used to mutually authenticate the client and the server using an authentication scheme diffie-hellman, RSA or another authentication scheme, and ongoing communications being protected by a symmetric key and optionally being signed. Alternatively or in addition, the communications mechanism may be based on a store and forward mechanism based on encrypted and signed archives, which are then transmitted individually or in batches between the user and service provider.

After, the service provider 20 receives a secured access request via the communications mechanism, the security application 36 decrypts the secured request, verifying the authenticity of the user. The security application 36 provides the decoded request and the security name of the originating user to the appropriate service application. The service application 40 may then utilize the SRA 22 to obtain user indexing information which may be required to process the request. Alternatively the security name may directly provide the user indexing information necessary to process the request in which case the SRA 22 is not utilized. Thus, having identified a particular user, the service provider 20 now utilizes the user database to process the requested service. For example, if the user has accessed its on-line banking service, the user may be asking for information related to its banking account (e.g., service fees, authorized signatories, the current balance, the last ten days of activity, etc.). Alternatively, the user may be requesting information regarding its checking account, money market funds, etc. As such, the service provider 20 would provide the requested information secured to the discretion of the service provider. For example, some general information such as office hours might not be encrypted.

Figure 2:
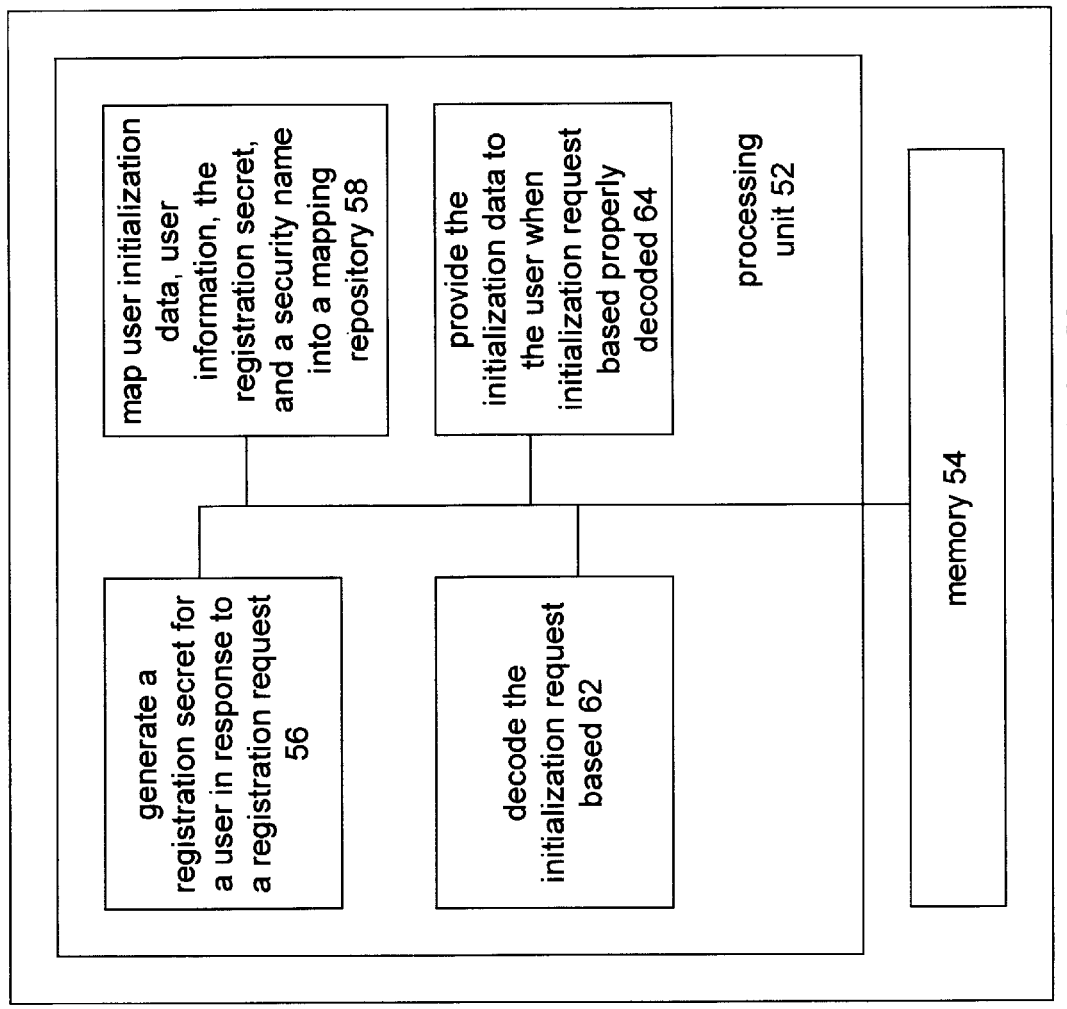
FIG. 2 illustrates a schematic block diagram of a service registration device in accordance with the present invention.

FIG. 2 illustrates a schematic block diagram of a service registration device 50. The service registration device may be a stand-alone device that includes the service registration application 22, which is stored in memory 54. The registration service device 50 includes a processing unit 52 and memory 54. The processing unit 52 may be a microprocessor, microcontroller, central processing unit, digital signal processor, microcomputer, and/or any device that manipulates digital information based on programming instructions. The memory 54 is a random access memory, reprogrammable memory, hard disk memory, floppy disk memory, CD memory, magnetic tape memory, and/or any device that stores digital information.

The memory 54 stores programming instructions, such as the service registration application 22, that when read by the processing unit, causes the processing unit 52 to function as a plurality of circuits 56–64. While reading the programming instructions, the processing unit 52 functions as a circuit 56 to generate a registration secret for a user in response to a registration request. Having done that, the processing unit reads programming instructions that cause it to function as circuit 58 to map initialization data, user information, the registration secret, and a security name into a mapping repository. When the processing unit receives an initialization request, it programming instructions that facilitates receipt of the initialization request from the user. The processing unit 52 then reads programming instructions that cause it to function as circuit 62 that decodes the initialization requests based on the registration secret and the user information. If the initialization request was decoded properly, the processing unit then reads programming instructions, which cause it to function as circuit 64 that provides the initialization data to the user. The functionality of processing unit 52 and the programming instructions it performs will be discussed in greater detail with reference to FIGS. 3 and 5.

Figure 3:
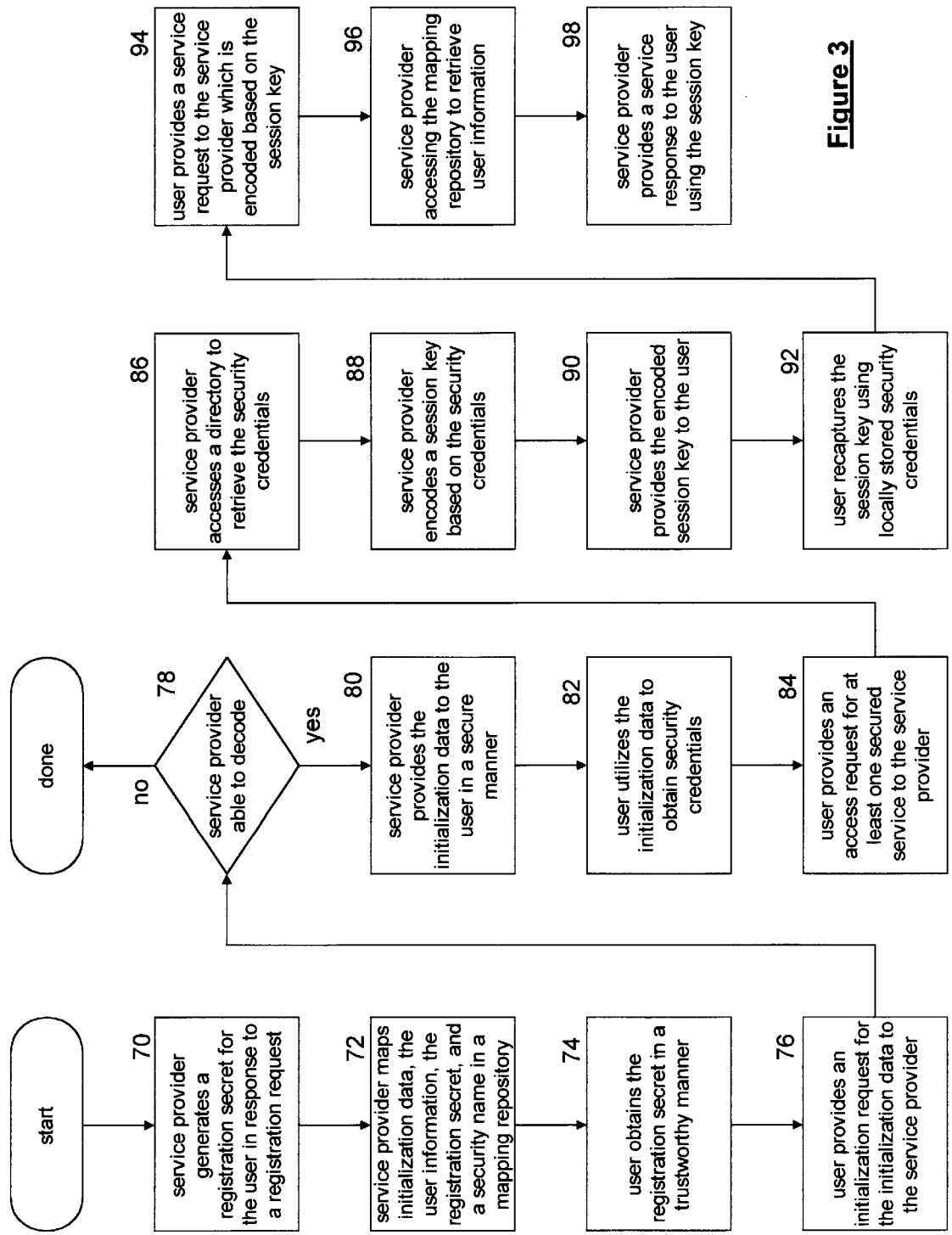
FIG. 3 illustrates a logic diagram of a method for a user to conduct on-line transactions in a more secure manner in accordance with the present invention.

FIG. 3 illustrates a logic diagram of a method for a service provider to provide secured services to a user or a plurality of users. The programming instructions of this process may be stored in a memory device such as memory device 54 or in a stand-alone memory device equivalent to that of memory device 54. The process begins at step 70 where the service provider generates a registration secret for a user in response to a registration request. The process then proceeds to step 72 where the service provider maps initialization data, the user information, the registration secret, and a secret name into a mapping repository. The initialization data is obtained from a security managing application, such as the certification authority 14 and/or a manager. The initialization information may be retrieved on a user by user basis (i.e., when a user initiates a request), or as a bulk-loading process. Note that the registration secret is considerably shorter than the initialization data. For example, the registration secret may be in the range of 8–16 digits (i.e., 30–40 bits) in length, while the initialization data may be in the range of 85 bits for reference number and authentication code.

The process then proceeds to step 74 where the requesting user obtains the registration secret from the service provider in a trustworthy manner. The trustworthy manner may be via an in-person transaction, over the telephone, by mail, electronic medium (e.g., ATM). The process then proceeds to step 76 where the user provides an initialization request for the initialization data to the service provider. The initialization request proves knowledge of the user identifying secret. The initialization request is provided to the service provider via a communication network, which may be the Internet. Alternatively, the initialization request may be encoded based on the registration secret and the user information. Note that the user information includes, for a banking application, information regarding the user such as credit card number, banking account number, checking account number, social security number, name, address and/or any other service relating identifier.

The process then proceeds to step 78 where the service provider determines whether it is able to decode the initialization request. If not, the process is complete for this particular request (e.g., the preceding steps were not followed). If, however, the service provider is able to decode the initialization request, the process proceeds to step 80. Note that the service provider may verify the request by determining that the user's copy of the user identifying secret matches the user identifying secret stored in the mapping repository. Further note that a match may occur from a direct comparison or inquires that would identify the user identifying secret. At step 80, the service provider provides the initialization data to the user in a secure manner based on the user identifying secret. The service provider provides the initialization data via the Internet or the communication network to the user. The process then proceeds to step 82 where the user decrypts the secured initialization data and utilizes the initialization data to obtain security credentials.

Once the security credentials have been obtained, the user may access secured services provided by the service provider. As such, at step 84, the user provides an access request for at least one secured service to the service provider. The request identifies the user by its security name. Thus, access requests provide no direction information about the user or the user's information (e.g., bank account number), thereby making the data useless to a hacker. The process then proceeds to step 86 where the service provider authenticates the user based on the security credentials of the user. The security credentials may be retrieved from a directory affiliated with the system. The process then proceeds to step 88 where the service provider encodes a session key based on the security parameters. As an alternative, the user could generate and encode the session key. The process then proceeds to step 90 where the service provider provides the encoded session key to the user.

When the user receives the encoded session key, the user, at step 92, recaptures the session by decoding the session key using locally stored security credentials. The process then proceeds to step 94 where the user provides a service request to the service provider. The request includes the security name and is secured based on the session key. Note that the security application 36 provides the security name to the service application 40 after authenticating the request. The process then proceeds to step 96 where the service provider accesses the mapping repository to retrieve the user information. The retrieved user information may relate to a particular service, a group of services, or a portion of the services available to the user.

The process then proceeds to step 98 where the service provider securely provides a service response to the user utilizing the secure communications mechanism. The service response was generated based on the user indexing information. Additionally, the service response could have been generated based on the user information. As such, the response provided to the user was encoded based on the session key. Thus, all communications for this particular session between the user and the service provider utilize the session key. In addition, if the user requests additional services, during this on-line affiliation, the same session key may be utilized or a new one may be generated.

Figure 4:
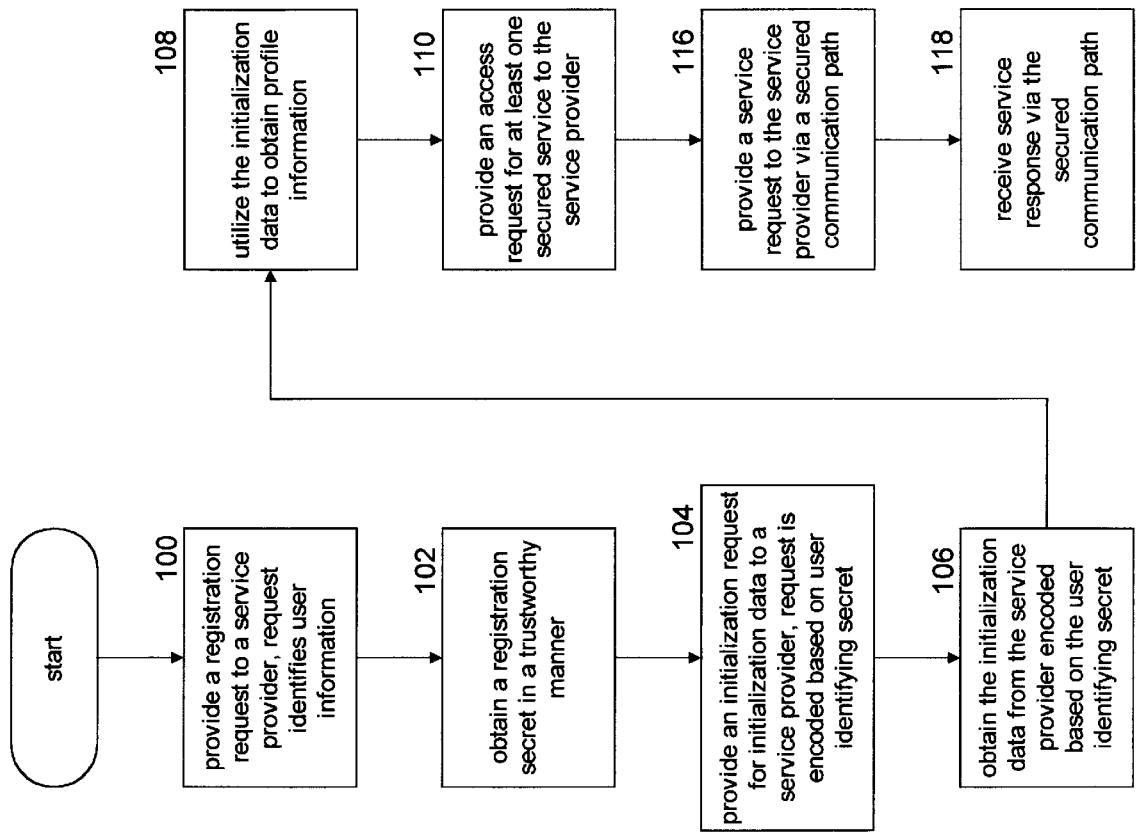
FIG. 4 illustrates a logic diagram of an alternate method for a user to conduct on-line transactions in a more secured manner in accordance with the present invention.

FIG. 4 illustrates a logic diagram of a method for a user to establish and then access secured on-line services. The programming instructions of this process may be stored in a memory device such as memory device 54 or in a stand-alone memory device equivalent to that of memory device 54. The process begins at step 100 where the user provides a registration request to a service provider. The request identifies user information (e.g., account number, credit card number). The process then proceeds to step 102 where the user obtains a registration secret in a trustworthy manner. Note that this step is optional for pre-shared secrets. The process then proceeds to step 104 where the user provides an initialization request for the initialization data. The request is provided to the service provider and is secured based on the user identifying secret. The process then proceeds to step 106 where the user obtains the initialization data from the service provider. The data received was secured based on the user secret.

The process then proceeds to step 108 where the user utilizes the initialization data to obtain profile information. Prior to doing this, however, the user decodes the initialization data based on the user secret. At this point, the registration secret is no longer used and can be discarded. The profile information obtained may be an encryption public certificate and/or a signature public certificate and corresponding private keys. The process then proceeds to step 110 where the user provides an access request for a least one secured service. The user may access a plurality of secured services in the same on-line session or in a plurality of on-line sessions. In addition, before providing the access request, the user may be asked to provide a password input, which would unlock the locally stored profile information. In addition, the user may be asked to provide its user information along with the password to unlock the locally stored security credentials. The locally stored profile information as previously mentioned includes the security name.

The process then proceeds to step 116 where the user establishes a secure communication mechanism (e.g., store and forward) and utilizes this to securely provide a service request to the service provider. The process then proceeds to step 118 where the user securely receives a service response for the requested service.

Figure 5:
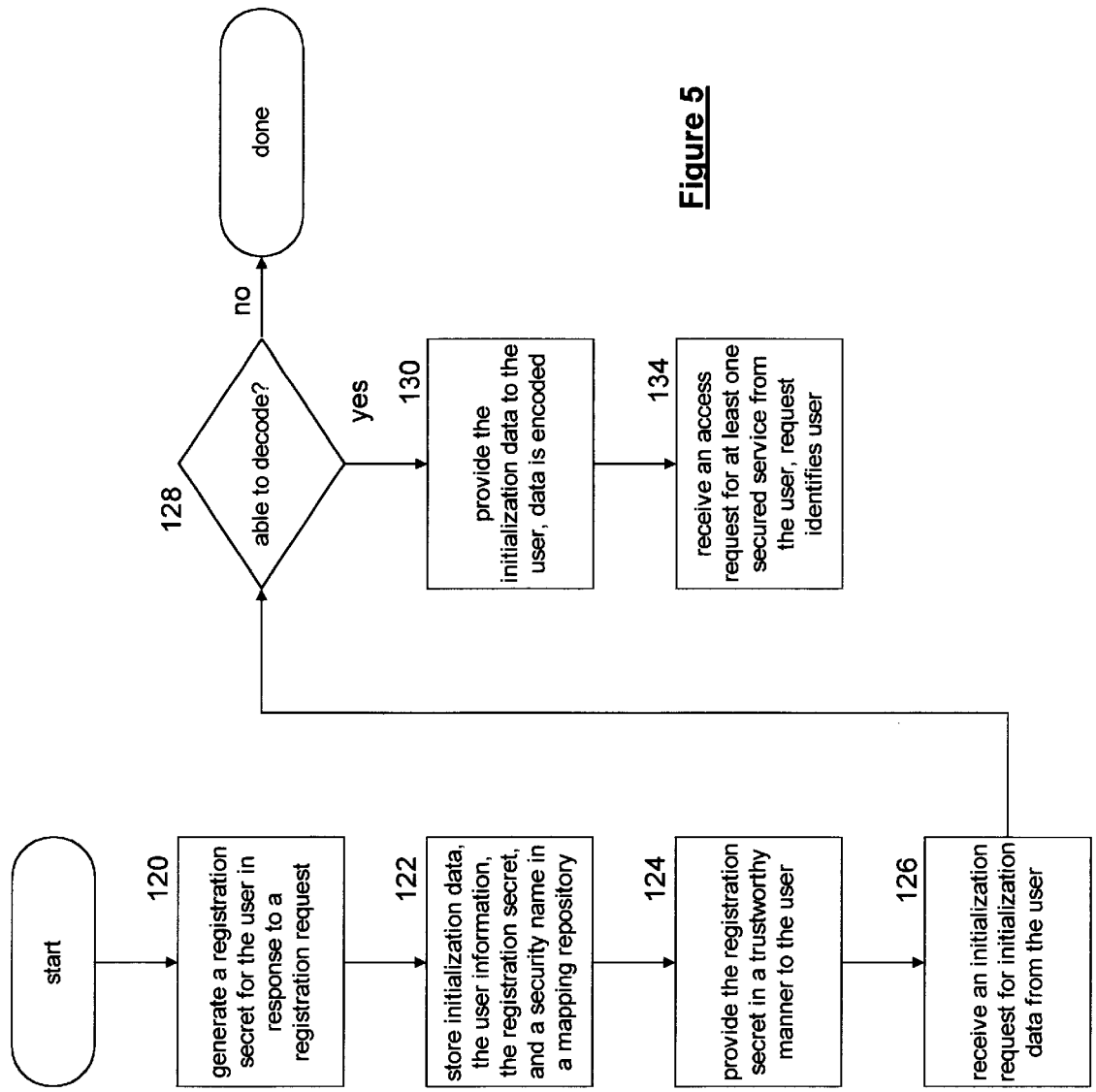
FIG. 5 illustrates a logic diagram of an alternate method for a service registration device to facilitate more secure on-line transactions in accordance with the present invention.

FIG. 5 illustrates a logic diagram of a method that may be performed by the service registration device to facilitate secured services. The programming instructions of this process may be stored in a memory device such as memory device 54 or in a stand-alone memory device equivalent to that of memory device 54. The process begins at step 120 where the service registration device generates a registration secret for a user in response to a registration request. The process then proceeds to step 122 where the service registration device stores initialization data, the user indexing information, the registration secret, and a security name in a mapping repository. The process then proceeds to step 124 where the service registration device provides the registration secret in a trustworthy manner to the user.

Having provided the registration secret, the process then proceeds to step 126 where the service registration device receives an initialization request for the initialization data from the user. The initialization request is contains proof of knowledge of the user identifying secret. The process then proceeds to step 128 where the service registration device determines whether it is able to verify the initialization request. If not, the process is complete for this particular request. If, however, the service registration device is able to validate the initialization request, the process proceeds to step 130. At step 130, the service registration device provides the initialization data to the user. The initialization data is secured based on the user secret.

The process then proceeds to step 134 where the security app 36 receives an access request for at least one secured service from the user. The process then proceeds to step 136 where the service application utilizes the service registration device to retrieve the user index based on the security name.

The preceding discussion has presented a method and apparatus for a service provider to provide secured on-line services to end-users. By utilizing security credentials and a security name, user identity information is protected such that it is extremely difficult for a hacker to learn the user information. In addition, by utilizing the security credentials, the service provider may verify the user's authenticity. As such, the overall security of on-line transactions has been enhanced.

What is claimed is:

1. A method for establishing secure services between a user and a service provider, the method comprises the steps of:
   a) storing, by the service provider, initialization data and mapped user identifying secret in a mapping repository;
   b) receiving, from the user, an initialization request for the initialization data to the service provider, wherein the initialization request is processed based on a user's copy of the user identifying secret;
   c) verifying, by the service provider, the initialization request based on the user identifying secret stored in the mapping repository;
   d) providing, by the service provider, processed initialization data to the user when the initialization request was verified, wherein the processed initialization data was provided in a secured manner based on the user identifying secret;
   e) processing, by the user, the processed initialization data based on the user's copy of the user identifying secret to recapture the initialization data; and
   f) utilizing, by the user, the initialization data to obtain profile information that is useable to access a secured service.

2. The method of claim 1 further comprises, prior to step (a), generating, by the service provider, a registration secret for the user in response to a registration request, wherein the registration request identifies user information associated with the user.

3. The method of claim 2, wherein step (a) further comprises storing at least one of: the registration secret, the user information, and a security name as the user identifying secret.

4. The method of claim 2 further comprises invalidating the registration secret when the user has not provided the initialization request within a specified timeframe.

5. The method of claim 2 further comprises obtaining, by the user, the registration secret in a trustworthy manner.

6. The method of claim 1, wherein step (d) further comprises encrypting the initialization data via an encryption key that is based on the user identifying secret as the secure manner.

7. The method of claim 1, wherein step (d) further comprises verifying the initialization request by determining whether the user's copy of the user identifying secret substantially matches the user identifying secret stored in the mapping repository.

8. The method of claim 1 further comprises accessing, by the user, at least one of a plurality of service applications supported by the service provider via a secure registration application based on the profile information, wherein the at least one of the plurality of service applications provides the secured service.

9. The method of claim 1 further comprises obtaining the initialization information and the security name by at least one of: user-by-user process and a bulk loading processing.

10. The method of claim 1, wherein the profile information further comprises security credentials associated with a security name of the user.

11. The method of claim 10, wherein the security credentials further comprises at least one of: an encryption public certificate and a signature verification public certificate.

12. The method of claim 10, wherein the security name further comprises an anonymous name such that the security credentials are contained in an anonymous certificate.

13. A method for accessing a secured service supported by a service provider, the method comprises the steps of:
   a) receiving, from the user, an access request for at least one secured service to the service provider, wherein the access request identifies the user by a security name;
   b) receiving, from the user, a service request to the service provider, wherein the service request includes the security name and is secured based on a key;
   c) accessing, by the service provider, a mapping repository to retrieve user information in response to the service request, wherein the mapping repository is accessed based on the security name; and
   (d) providing, by the service provider, a service response to the user, wherein the service response is encoded based on the user information.

14. The method of claim 13 further comprises, within step (b), receiving a password input to unlock the locally stored profile information.

15. The method of claim 13 further comprises, within step (c), retrieving at least one of: the user information relating to the service request, the user information relating to services available to the user, and the user information relating to a portion of the services available to the user.

16. The method of claim 13 further comprises, within step (a), providing the access request in response to receiving at least one of: a valid password and the user information.

17. A method for a user to facilitate establishment of secure services between the user and a service provider, the method comprises the steps of:
   a) providing an initialization request for initialization data to the service provider, wherein the initialization request is processed based on a user's copy of a user identifying secret;
   b) receiving, from the service provider, processed initialization data when the initialization request was verified, wherein the processed initialization data was provided in a secured manner based on the user identifying secret;
   c) processing the processed initialization data based on the user's copy of the user identifying secret to recapture the initialization data; and
   d) utilizing the initialization data to obtain profile information that is useable to access a secured service.

18. The method of claim 17 further comprises, prior to step (a), providing a registration request to obtain a registration secret, wherein the registration request identifies user information associated with the user.

19. The method of claim 18 further comprises obtaining the registration secret in a trustworthy manner.

20. The method of claim 18, wherein step (b) further comprises receiving the initialization data that has been encrypted via an encryption key that is based on the user identifying secret.

21. The method of claim 17 further comprises accessing at least one of a plurality of service applications supported by the service provider via a secure registration application based on the profile information, wherein the at least one of the plurality of service applications provides the secured service.

22. A method for facilitating establishment of secure services between a user and a service provider, the method comprises the steps of:
   a) storing initialization date and an user identifying secret in a mapping repository;
   b) receiving an initialization request for the initialization data to the service provider, wherein the initialization request is processed based on a user's copy of the user identifying secret;
   c) verifying the initialization request based on the user identifying secret stored in the mapping; and
   d) providing processed initialization data to the user when the initialization request was verified, wherein the processed initialization data was provided in a secured manner based on the user identifying secret.

23. The method of claim 22 further comprises, prior to step (a), generating a registration secret for the user in response to a registration request, wherein the registration request identifies user information associated with the user.

24. The method of claim 23, wherein step (a) further comprises storing at least one of: the registration secret, the user information, and a security name as the user identifying secret.

25. The method of claim 23 further comprises invalidating the registration secret when the user has not provided the initialization request within a specified timeframe.

26. The method of claim 22, wherein step (d) further comprises encrypting the initialization data via an encryption key that is based on the user identifying secret as the secure manner.

27. The method of claim 22, wherein step (d) further comprises verifying the initialization request by determining whether the user's copy of the user identifying secret substantially matches the user identifying secret stored in the mapping repository.

28. The method of claim 22 further comprises obtaining the initialization information and the security name by at least one of: a user-by-user process and a bulk loading processing.

29. A digital storage medium for storing programming instructions that, when read by a processing unit, cause the processing unit to facilitate secure service processing, the digital storage medium comprises:
- first storage means for storing programming instructions that cause the processing unit to provide an initialization request for initialization to the service provider, wherein the initialization request is processed based on a user's copy of a user identifying secret;
- second storage means for storing programming instructions that cause the processing unit to receive, from a service provider, processed initialization data when the initialization request was verified, wherein the processed initialization data was provided in a secured manner based on the user identifying secret;
- third storage means for storing programming instructions that cause the processing unit to process the processed initialization data based on the user's copy of the user identifying secret to recapture the initialization data; and
- fourth storage means for storing programming instructions that cause the processing unit to utilize the initialization data to obtain profile information that is useable to access a secured service.

30. The digital storage medium of claim 29 further comprises programming instructions that cause the processing unit to provide a registration request to obtain a registration secret, wherein the registration request identifies user information associated with the user.

31. The digital storage medium of claim 29 further comprises programming instructions that cause the processing unit to obtain the registration secret in a trustworthy manner.

32. The digital storage medium of claim 29 further comprises programming instructions that cause the processing unit to receive the initialization data that has been encrypted via an encryption key that is based on the user identifying secret.

33. The digital storage medium of claim 29 further comprises programming instructions that cause the processing unit to access at least one of a plurality of service applications supported by the service provider via a secure registration application based on the profile information, wherein the at least one of the plurality of service applications provides the secured service.

34. A digital storage medium for storing programming instructions that, when read by a processing unit, cause the processing unit to facilitate secure service processing, the digital storage medium comprises:
- first storage means for storing programming instructions that cause the processing unit to store initialization data and an user identifying secret in a mapping repository;
- second storage means for storing programming instructions that cause the processing unit to receive an initialization request for the initialization data to the service provider, wherein the initialization request is processed based on a user's copy of the user identifying secret;
- third storage means for storing programming instructions that cause the processing unit to verify the initialization request based on the user identifying secret stored in the mapping; and
- fourth storage means for storing programming instructions that cause the processing unit to provide processed initialization data to the user when the initialization request was verified, wherein the processed initialization data was provided in a secured manner based on the user identifying secret.

35. The digital storage medium of claim 34 further comprises programming instructions that cause the processing unit to generate a registration secret for the user in response to a registration request, wherein the registration request identifies user information associated with the user.

36. The digital storage medium of claim 34 further comprises programming instructions that cause the processing unit to store at least one of: the registration secret, the user information, and a security name as the user identifying secret.

37. The digital storage medium of claim 34 further comprises programming instructions that cause the processing unit to invalidate the registration secret when the user has not provided the initialization request within a specified timeframe.

38. The digital storage medium of claim 34 further comprises programming instructions that cause the processing unit to encrypt the initialization data via an encryption key that is based on the user identifying secret as the secure manner.

39. The digital storage medium of claim 34 further comprises programming instructions that cause the processing unit to verify the initialization request by determining whether the user's copy of the user identifying secret substantially matches the user identifying secret stored in the mapping repository.

40. The digital storage medium of claim 34 further comprises programming instructions that cause the processing unit to obtain the initialization information and the security name by at least one of: a user-by-user process and a bulk loading processing.

41. A service registration device comprises:
- a processing unit; and
- memory operably coupled to the processing unit, wherein the memory stores programming instructions that, when read by the processing unit, cause the processing unit to:
- store initialization data and an user identifying secret in a mapping repository;
- receive an initialization request for the initialization data to the service provider, wherein the initialization request is processed based on a user's copy of the user identifying secret;
- verify the initialization request based on the user identifying secret stored in the mapping; and
- to provide processed initialization data to the user when the initialization request was verified, wherein the processed initialization data was provided in a secured manner based on the user identifying secret.

42. The service registration device of claim 41, wherein the memory further comprises programming instructions that cause the processing unit to generate a registration secret for the user in response to a registration request, wherein the registration request identifies user information associated with the user.

43. The service registration device of claim 41, wherein the memory further comprises programming instructions that cause the processing unit to store at least one of: the registration secret, the user information, and a security name as the user identifying secret.

44. The service registration device of claim 41, wherein the memory further comprises programming instructions that cause the processing unit to invalidate the registration secret when the user has not provided the initialization request within a specified timeframe.

45. The service registration device of claim 41, wherein the memory further comprises programming instructions that cause the processing unit to encrypt the initialization data via an encryption key that is based on the user identifying secret as the secure manner.

46. The service registration device of claim 45, wherein the memory further comprises programming instructions that cause the processing unit to verify the initialization request by determining whether the user's copy of the user identifying secret substantially matches the user identifying secret stored in the mapping repository.

47. The service registration device of claim 41, wherein the memory further comprises programming instructions that cause the processing unit to obtain the initialization information and the security name by at least one of: a user-by-user process and a bulk loading processing.

* * * * *